US012751419B2

(12) United States Patent
Coiro et al.

(10) Patent No.: US 12,751,419 B2
(45) Date of Patent: Oct. 6, 2026

(54) METHOD AND SYSTEM FOR CONNECTING AN ANIMAL CAGE MONITORING SYSTEM TO AN ANIMAL CAGE RACK

(71) Applicant: ALLENTOWN LLC, Allentown, NJ (US)

(72) Inventors: John Coiro, Allentown, NJ (US); Steven J. Miller, Allentown, NJ (US); Jennifer Stark, Allentown, NJ (US)

(73) Assignee: Allentown LLC, Allentown, NJ (US)

( * ) Notice: Subject to any disclaimer, the term of this patent is extended or adjusted under 35 U.S.C. 154(b) by 176 days.

(21) Appl. No.: 17/826,388

(22) Filed: May 27, 2022

(65) Prior Publication Data

US 2022/0378012 A1 Dec. 1, 2022

Related U.S. Application Data

(60) Provisional application No. 63/193,617, filed on May 27, 2021.

(51) Int. Cl.
*A01K 1/03* (2006.01)
*A01K 11/00* (2006.01)

(52) U.S. Cl.
CPC ............ *A01K 1/031* (2013.01); *A01K 11/006* (2013.01)

(58) Field of Classification Search
CPC .......... A01K 1/031; A01K 1/032; A01K 1/03; A01K 29/005
See application file for complete search history.

(56) References Cited

U.S. PATENT DOCUMENTS

| | | | | |
|---|---|---|---|---|
| 5,301,634 A * | 4/1994 | Ho | A01K 39/012 119/482 |
| 5,307,757 A | 5/1994 | Coiro, Sr. et al. | |
| 5,447,118 A * | 9/1995 | Huff | A01K 1/0356 119/72.5 |
| 8,499,719 B2 * | 8/2013 | Brocca | A01K 5/0275 119/57.92 |
| 2005/0241591 A1 | 11/2005 | Ingley, III et al. | |
| 2007/0256643 A1 | 11/2007 | Coiro et al. | |
| 2011/0005465 A1 * | 1/2011 | Tamborini | A01K 1/0047 119/419 |
| 2012/0085291 A1 | 4/2012 | Conger et al. | |
| 2012/0234255 A1 * | 9/2012 | Bernardini | A01K 1/031 119/452 |
| 2015/0359189 A1 * | 12/2015 | Bernardini | A01K 1/0047 119/419 |
| 2018/0027685 A1 * | 1/2018 | Miller | G06F 3/0664 |

(Continued)

OTHER PUBLICATIONS

Interanational Search Report, PCT/US2022/031311 Mailed Aug. 19, 2022.

*Primary Examiner* — Peter M Poon
*Assistant Examiner* — Shada Mohamed Alghailani
(74) *Attorney, Agent, or Firm* — SLEMAN & LUND LLP

(57) ABSTRACT

A method and system for removably connecting the animal cage monitoring system to an animal rack. The monitoring system can include a data collection platform. Data from an RFID chipped animal within a cage can be wirelessly transmitted to the data collection platform. An individual chipped animal is associated with the data collection platform. The data collection platform and associated cage being removably received in a data collection rack. One or more removably mountable data collection processors can be attached to the data collection rack.

18 Claims, 8 Drawing Sheets

(56) References Cited

U.S. PATENT DOCUMENTS

| | | | | |
|---|---|---|---|---|
| 2018/0103609 | A1* | 4/2018 | Coiro | A01K 1/031 |
| 2018/0168123 | A1 | 6/2018 | Coiro et al. | |
| 2018/0325083 | A1 | 11/2018 | Lhamon et al. | |
| 2023/0337625 | A1* | 10/2023 | Vagima | A01K 1/031 |

* cited by examiner

METHOD AND SYSTEM FOR CONNECTING AN ANIMAL CAGE MONITORING SYSTEM TO AN ANIMAL CAGE RACK

BACKGROUND OF THE INVENTION

Field of the Invention

The present invention relates generally to automated animal cage monitoring and in particular to a method and system for connecting an animal cage monitoring system to an animal cage rack.

Description of Related Art

The monitoring of conditions of animal cages has been described. U.S. Patent Application Publication No. 2005/0241591 describes an animal cage in which a rear wall has an opening for inserting a monitoring module. The monitoring monitor monitors various conditions of the cage. A radio frequency identification (RFID) tag can be integrated with the monitoring linkage. The RFID tag can be programmed with identification information, such as number of the cage, type of animal, number of animals and type of testing. The tag can be read with a reader to keep track and identify each cage.

U.S. Pat. No. 5,307,757 describes a ventilated animal rack and animal cage system including a forced air system in which positive air is supplied by an air inlet manifold. Air is removed from the cage by negative air pressure to an exhaust manifold. The exhausted air is treated with a laboratory air treatment system or portable HEPA filtered exhaust unit and is released to the atmosphere.

It is desirable to provide a method and system for automatically monitoring conditions of animals in the animal cage and for removably connecting the animal cage monitoring system to an animal rack and animal cage system.

SUMMARY OF THE INVENTION

The present invention relates to a method and system for automatically monitoring conditions of animals in the animal cage and for removably connecting the animal cage monitoring system to an animal rack. The monitoring system can include a data collection platform. Data from an animal cage can be wirelessly transmitted to the data collection platform. In one embodiment, the data collection platform receives data from a radio frequency identification (RFID) tag associated with the animal cage or associated with an animal inhabiting the animal cage.

The system for removably connecting the animal cage monitoring system to an animal rack includes a data collection rack. Data collection platform includes a mount. The mount includes runners on either side of mount. The runners can be removably received on a suspended runner system of the data collection rack to mount the data collection platform to the data collection rack.

Data from the data the collection rack can be forwarded to a portable collection processor and/or one or more removably mountable data collection processors. The mountable data collection processors are removable from the data collection rack to enable repeatable autoclaving, chemical decontamination, such as with vaporized hydrogen peroxide gas, chlorine dioxide gas or wet chemical wipe down, and repeatable washing cycles of the animal cage rack and the animal cages.

The invention will be more fully described by reference to the following drawings.

DETAILED DESCRIPTION

Figure 1:
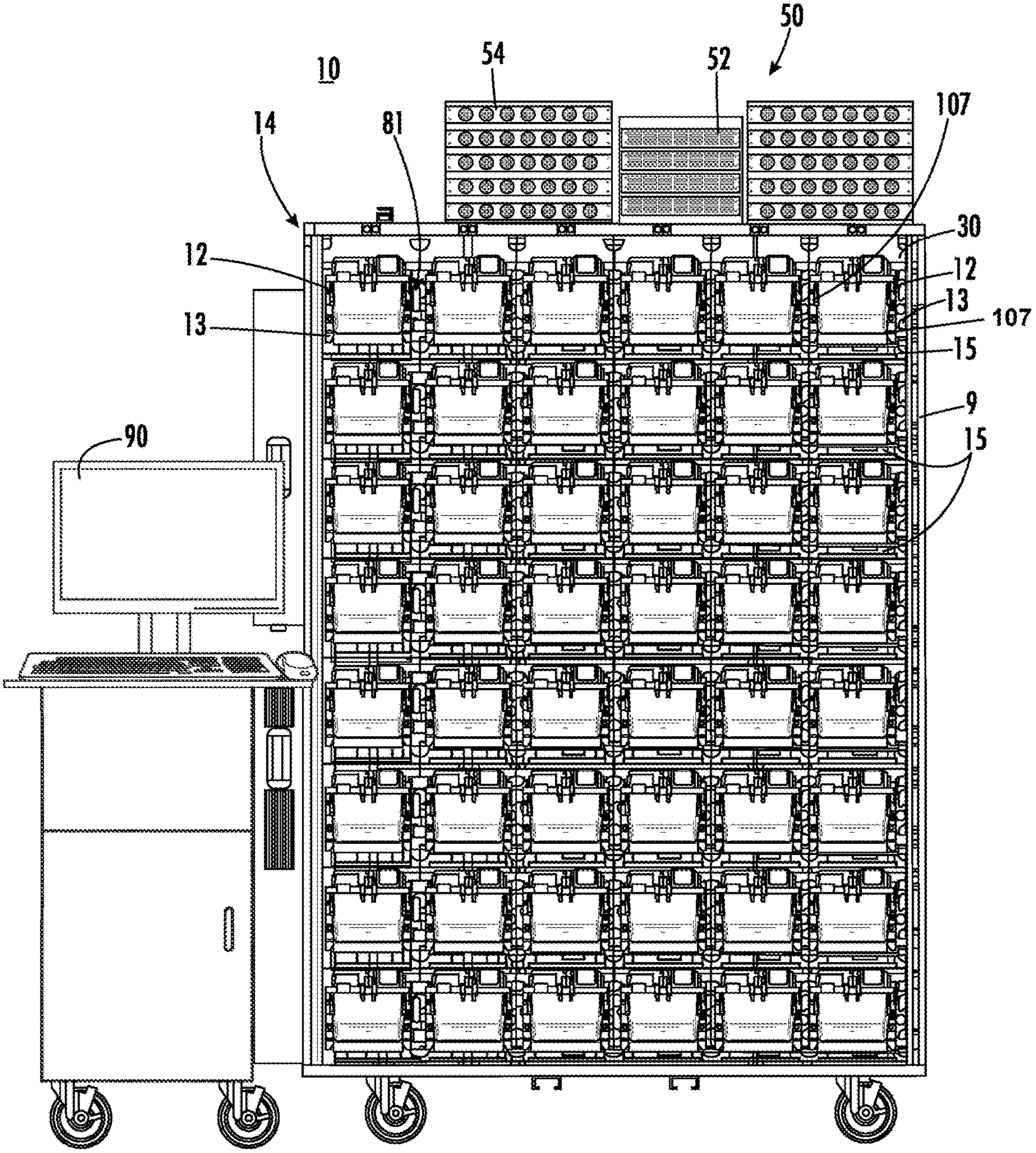
FIG. 1 is a schematic diagram a system for removably connecting an animal cage monitoring system to an animal rack.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a schematic diagram of a system for removably connecting an animal cage monitoring system to an animal rack 10. Individual animal cages 12 are supported on at least one shelf, platform or suspended runner system 13 on rows 15 of data collection rack 14. Example animal cages in NexGen 500 re-usable and EasyCage Mouse Disposable manufactured by Allentown, LLC. Data collection rack 14 can include animal cage rack 9. Example animal cage racks 9 can be a ventilated rack or a static air rack. Example animal cage racks are manufactured by Allentown, LLC as Nexgen, Micro-Vent and PNC.

Data collection platform 11 is associated with animal cage 12 as shown in FIGS. 2A-2D. Data collection platform 11 receives data 80 from a radio frequency identification (RFID) tag 81 associated with animal cage 12 or associated with an animal inhabiting animal cage 12 (not shown). In one embodiment, data 80 is received from a RFID chipped animal. Example data 80 can include data directed to a temperature of an animal or data directed to movement of an animal inhabiting animal cage 12.

An example animal cage 12 includes cage base 16 and cage top 17. Cage top 17 includes walls 19 extending from ceiling 18. Walls 19 and ceiling 18 can be integral to one another. Ceiling 18 can be substantially flat. Cage base 16 includes walls 31 extending from floor 32. Walls 31 and floor 32 can be integral to one another. Walls 31 of cage base 16 support cage top 17 on top edge 44. Cage base 16 and cage top 17 can be snap fitted to one another. Top edge 44 of cage base 16 extends from cage base 16. Referring to FIG. 1, Top edge 44 of cage base 16 extending from cage base 16 can be received within suspended runner system 13 for automatically locking cage base 16 and cage top 17 together.

Animal cage 12 can include nozzle 20 which includes at least one air opening 22 formed in end 24 of nozzle 20 for emitting air 28 into animal cage 12. Air supply plenum provides air 28 to nozzle 20. Air 28 circulates within animal cage 12 and exits animal cage 12 as exhaust 29 to exhaust plenum. Exhaust plenum connects to exhaust plenum 30 of data collection rack 14 as shown in FIG. 1.

Air delivery and exhaust apparatus 50 comprises at least one rack mounted supply blower 52 and at least one rack mounted exhaust blower 54 for supplying air to data collection rack 14 and removing exhaust from data collection rack 14 Alternatively air delivery and exhaust apparatus can supply and exhaust air via wall mounted or tower blower ventilation system, such as one manufactured by Allentown LLC. as an EcoFlo Rack, EcoFlow Tower. Alternatively air delivery and exhaust apparatus can be supplied by an above ceiling or remotely mounted air supply device such as one manufactured by Allentown LLC. Eco Flow Interstitial Blower while using the facility available exhaust system to exhaust the rack such as demonstrated in the Allentown LLC. system FIAS (Facility Integrated Airflow Solutions).

Figure 2A:
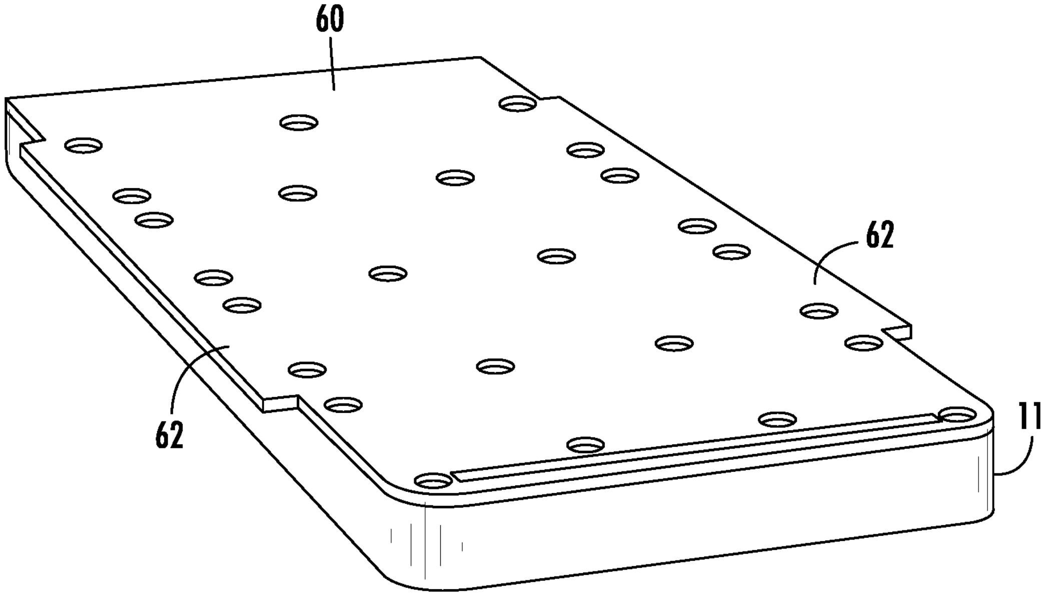
FIG. 2A is a schematic diagram of a data collection platform.
Figure 2B:
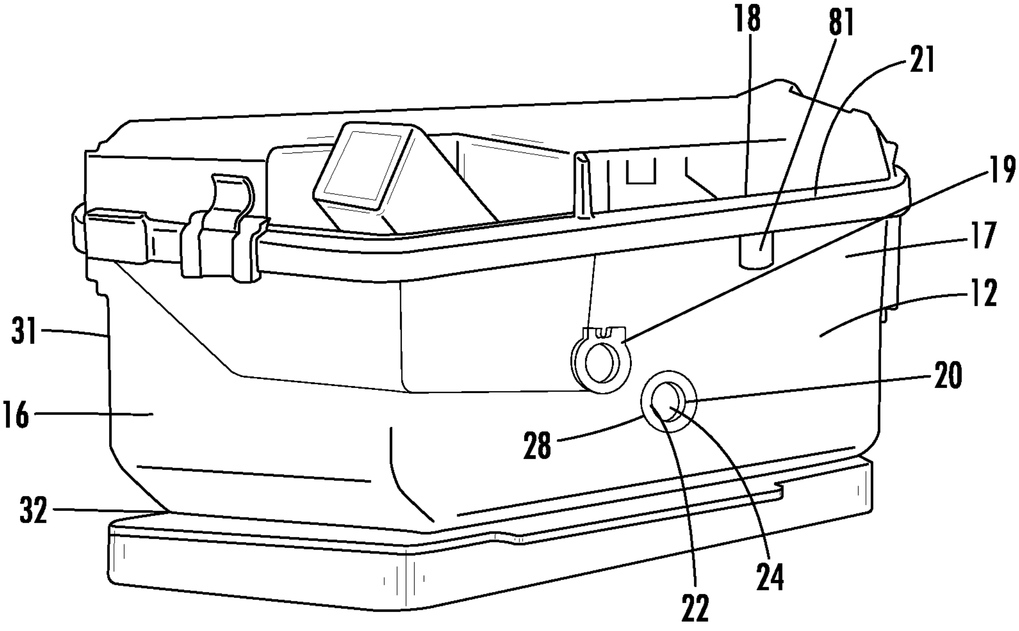
FIG. 2B is a schematic diagram of the data collection platform in combination with an animal cage.
Figure 2C:
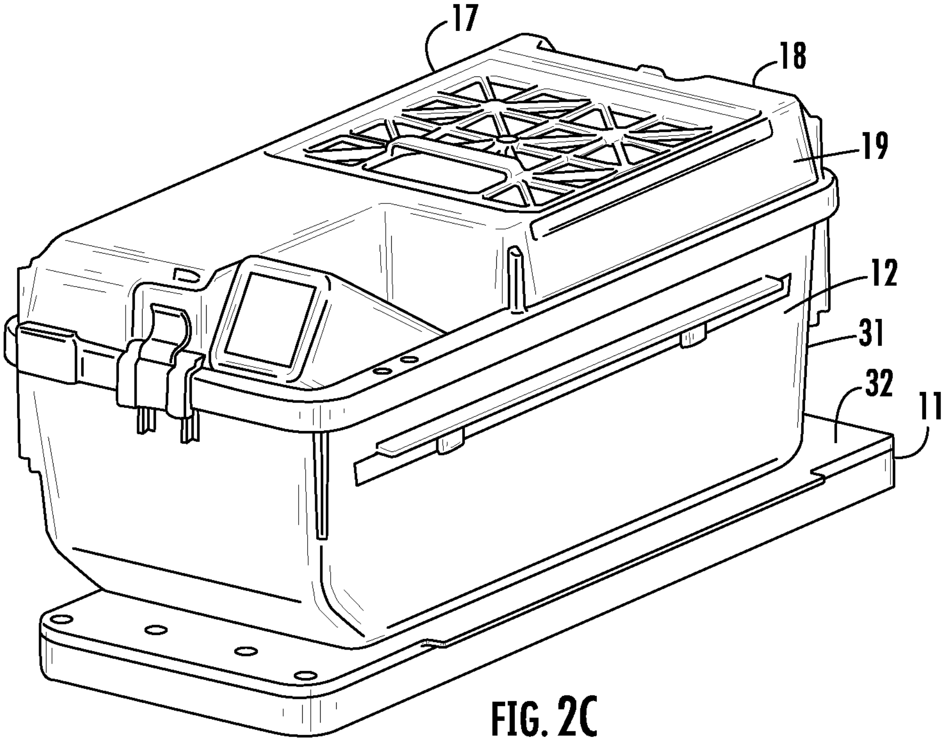
FIG. 2C is a schematic diagram of the data collection platform in combination with an animal cage.
Figure 2D:
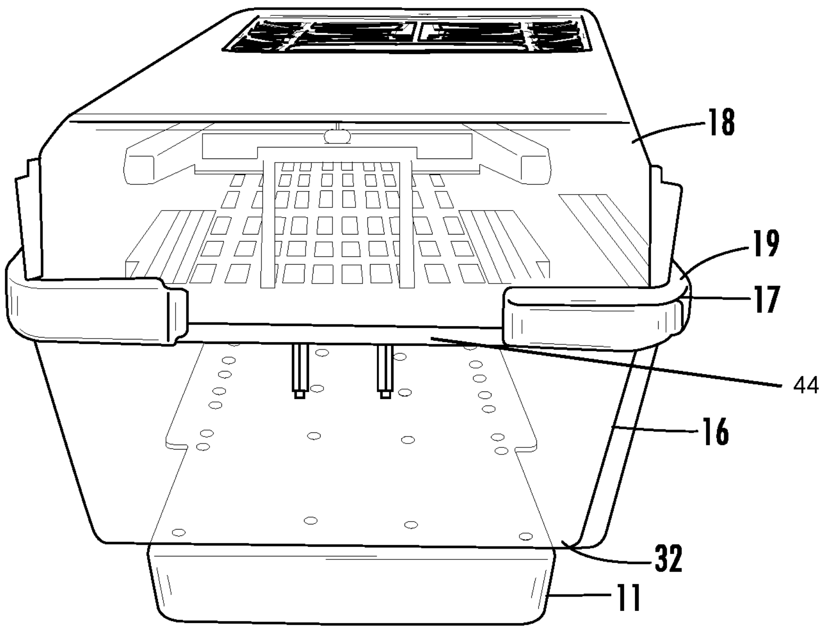
FIG. 2D is a schematic diagram of the data collection platform in combination with an animal cage.
Figure 3A:
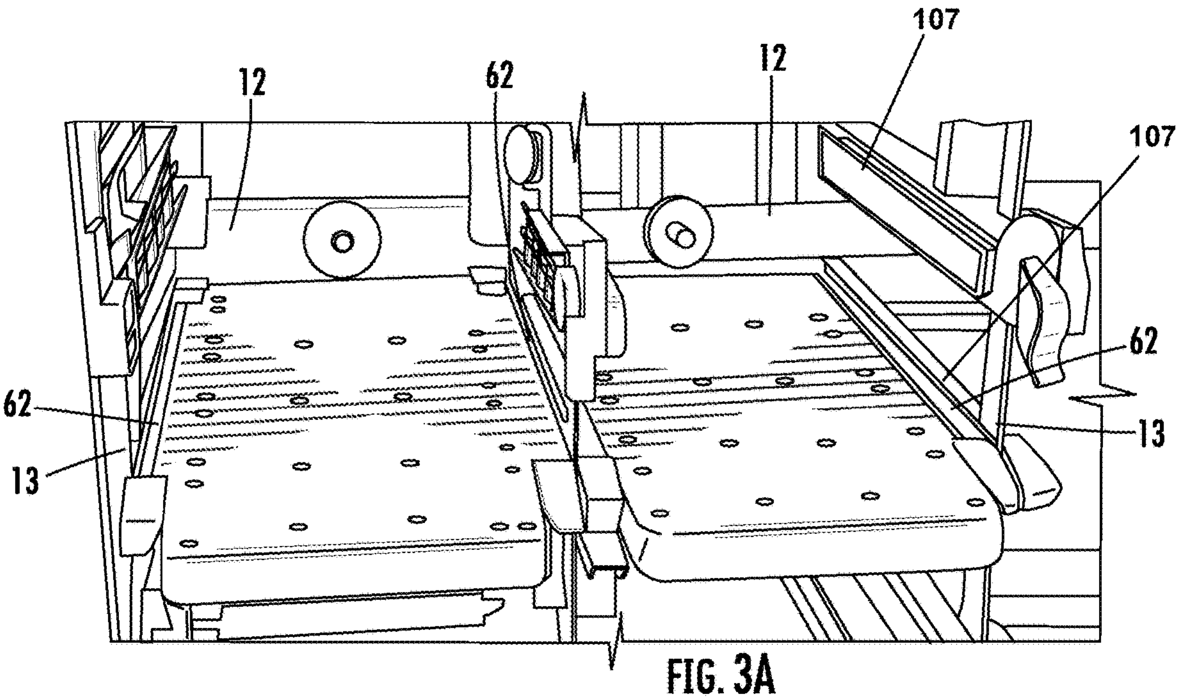
FIG. 3A is a front schematic view of a data collection device in combination with a data collection rack.
Figure 3B:
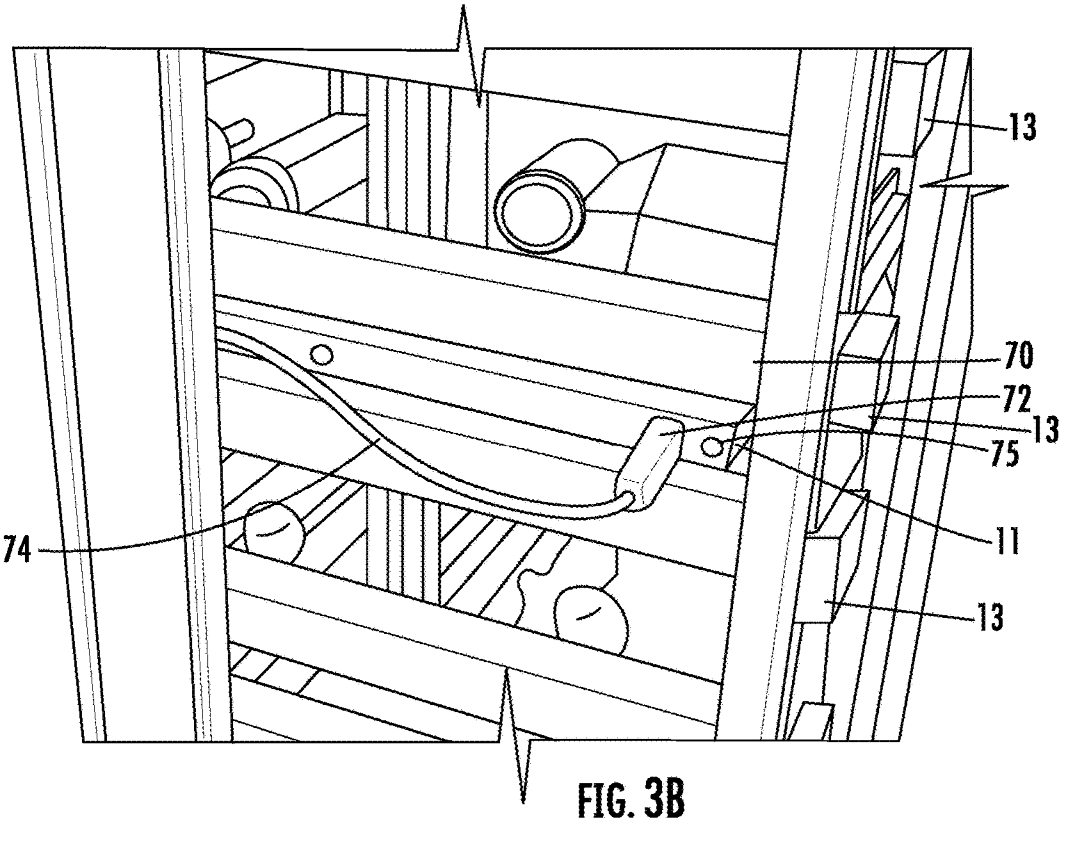
FIG. 3B is a rear schematic view of the data collection rack.

Data collection platform 11 includes mount 60 as shown in FIG. 2A. Base 32 of animal cage 12 can be supported by mount 60 as shown in FIGS. 2B-2D. Mount 60 includes edge runners 62 protruding on either side of mount 60. Edge runners 62 can be removably received on runners 107 of suspended runner system 13 as shown in FIG. 3A. Rear 70 of data collection rack 14 can include socket attachments 72 for removably receiving cables 74 as shown in FIG. 3B. Cables 74 can connect to rear 75 of data collection platform 11.

Figure 4A:
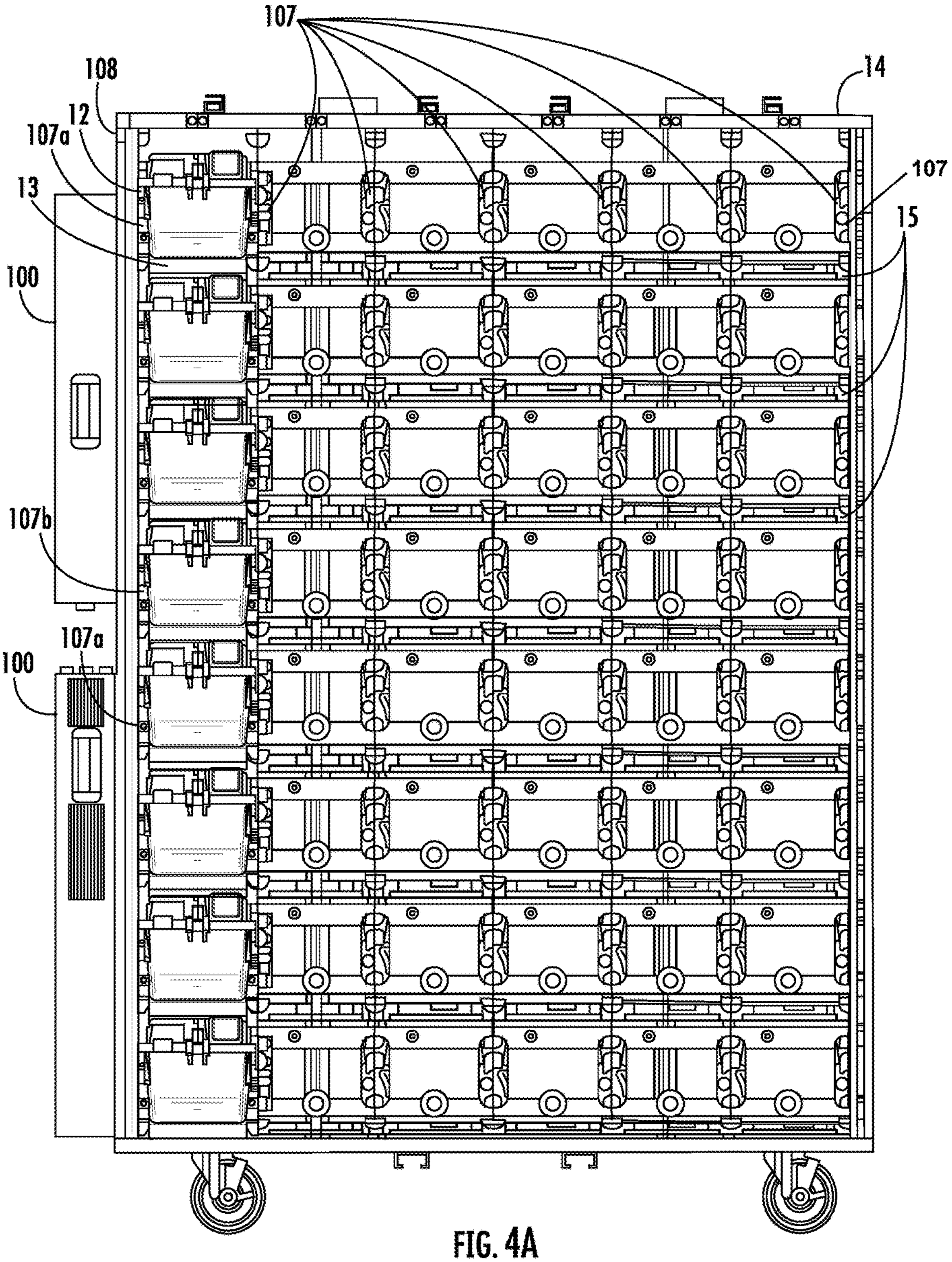
FIG. 4A is a schematic diagram of a data collection rack.
Figure 4B:
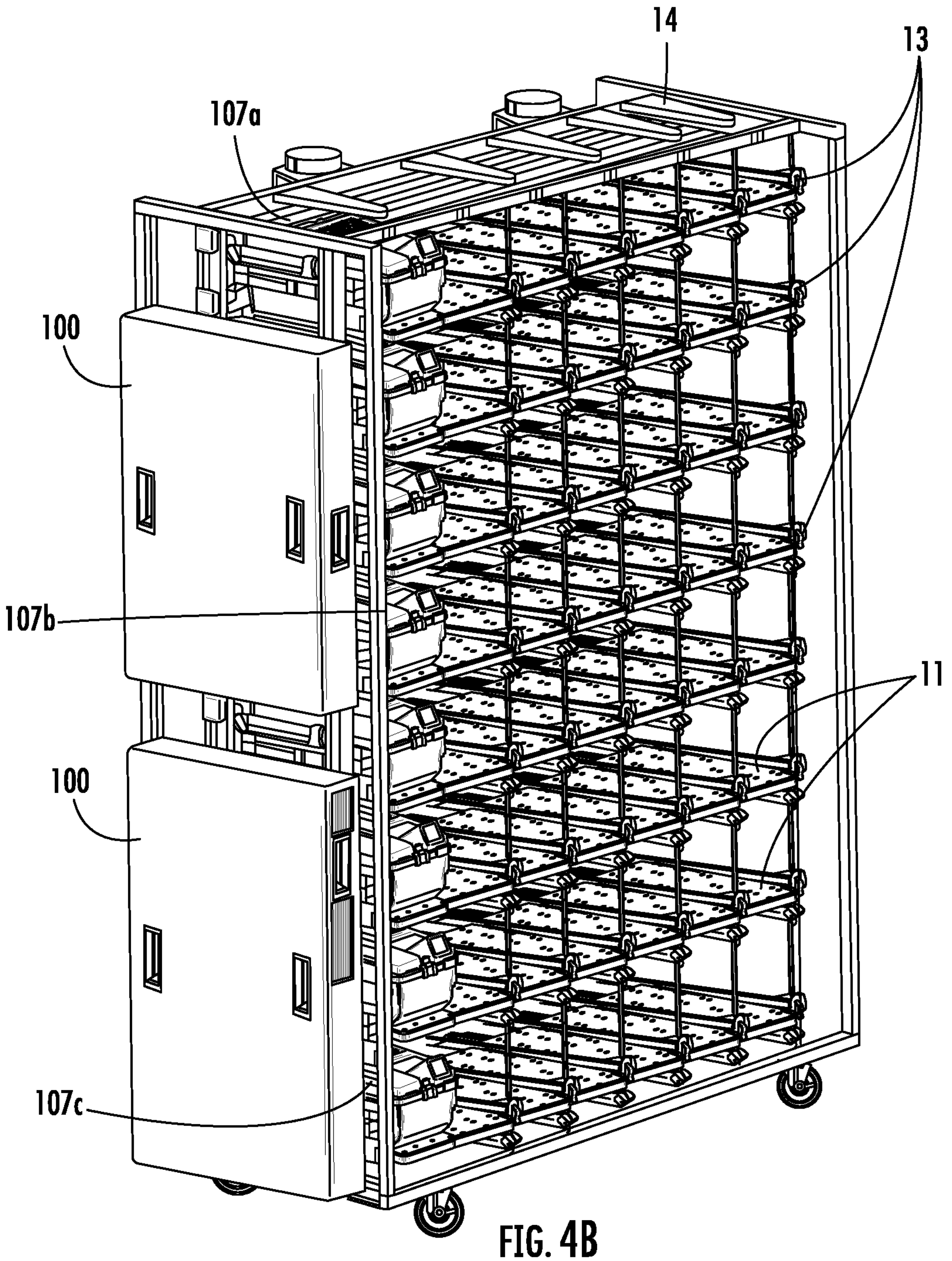
FIG. 4B is a schematic diagram of the data collection rack.
Figure 5A:
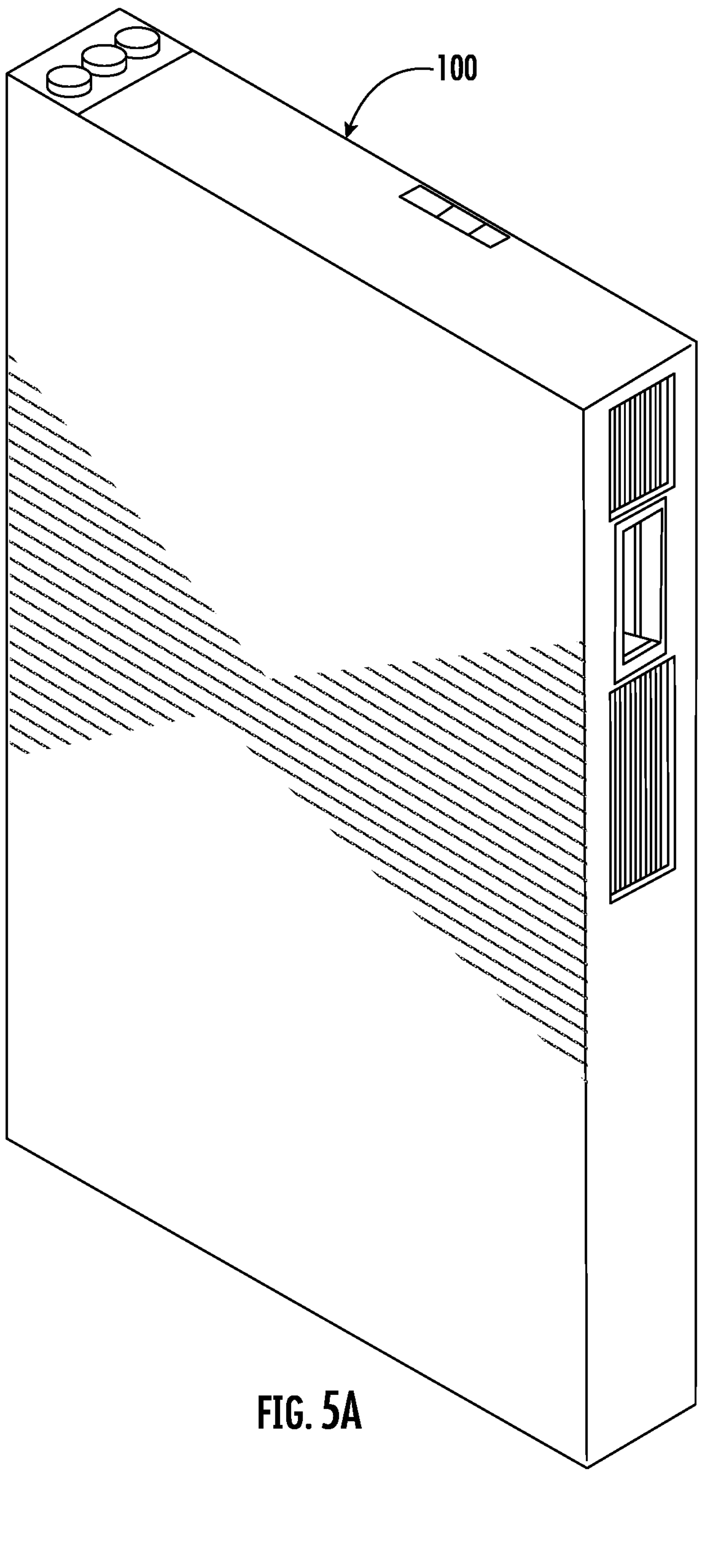
FIG. 5A is a schematic front view of a data collection processor.
Figure 5B:
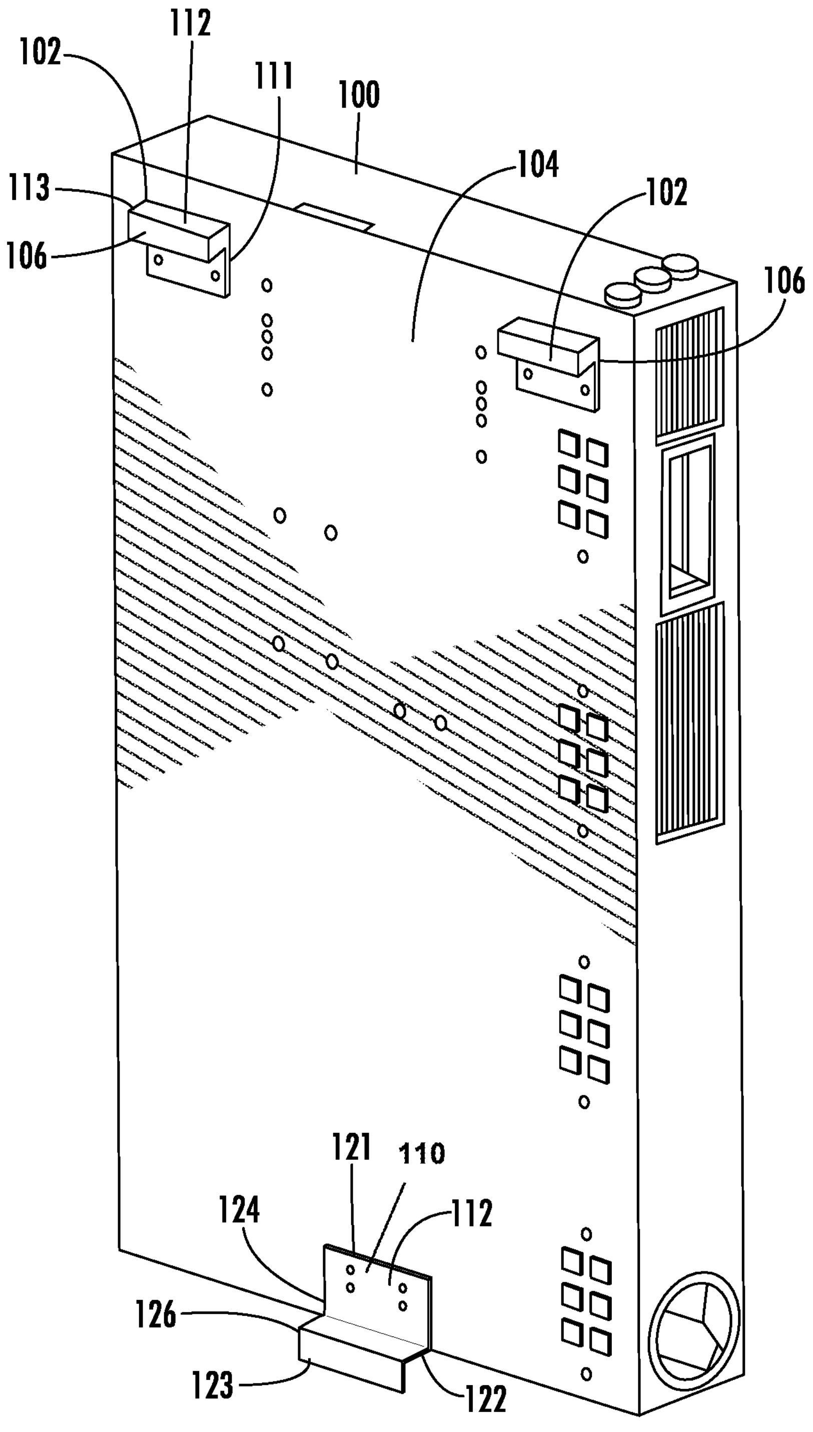
FIG. 5B is a schematic rear view of the data collection processor.

Data 80 from data the collection rack 14 can be forwarded to portable collection processor 90 as shown in FIG. 1. Data 80 from data collection rack 14 can be forwarded to one or more mountable data collection processors 100 as shown in FIGS. 4A-4B. Data 80 is received at portable collection processor 90 and/or mountable data collection processors 100. Mountable data collection processors 100 are removable from data collection rack 14 to enable repeatable autoclaving, chemical decontamination, such as with vaporized hydrogen peroxide gas, chlorine dioxide gas or wet chemical wipe down, and repeatable washing cycles of the data collection rack 14 and animal cages 12.

In one embodiment, mountable data processor 100 includes a pair of hangers 102 on rear surface 104 of mountable data processor 100. Hangers 102 can be removably attached to side 108 of data collection rack 14. Hanger 102 can include flange 106. Flange 106 can be a u shaped flange. Flange 106 can include wall mount 111, top wall 112 and side wall 113 which are coupled or integral to one another to form flange 106. Wall mount 111 and side wall 113 can be perpendicular to top wall 112. Suspended runner system 13 can include a plurality of runners 107. Top wall 112 of flange 106 can be received over runner 107*a* of suspended runner system 13.

Bottom mount 110 includes bottom mount flange 112. Bottom mount flange 112 can include wall mount 121, bottom wall 122 and side wall 123 which are coupled or integral to one another to form bottom mount flange 112. Bottom mount flange can have a stepped shape. Wall mount 121 can extend upwardly perpendicular to edge 124 of bottom wall 122. Side wall 123 can extend downwardly perpendicular from edge 126 of bottom wall 122. Bottom wall 122 of bottom mount flange 112 can be received over runner 107*b* of suspended runner system 13.

It is to be understood that the above described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A monitoring system for automatically monitoring conditions of animals in an animal cage comprising:

a data collection rack supporting at least one animal cage, the data collection rack includes a suspended runner system;

the at least one animal cage comprising a cage top, the cage top including one or more walls extending from a ceiling, the ceiling is substantially flat and a cage base, the cage base including one or more walls extending from a floor;

the cage base includes a top edge which extends from the cage base, the top edge being received on a first pair of runners of the suspended runner system, a first runner of the first pair of runners positioned adjacent a first side of the cage base and a second runner of the first pair of runners positioned adjacent a second side of the cage base;

a removable data collection platform associated with the at least one animal cage, the removable data collection platform being independent from the at least one animal cage, the removable data collection platform includes a mount on a first side and a second side of the data collection platform, the mount includes edge runners, the edge runners being removably received on a second pair of runners of the suspended runner system, a first runner of the second pair of runners positioned adjacent a first side of the removable data collection platform and a second runner of the second pair of runners positioned adjacent a second side of the removable data platform to removably attach said removable data collection platform to said data collection rack, said removable data collection platform receiving data associated with the at least one animal cage and/or data associated with an animal inhabiting the at least one animal cage; and at least one data collection processor, said at least one data collection processor receiving the data from the removable data collection platform wherein the removable data collection platform and the at least one animal cage are independently removable from the data collection rack.

2. The monitoring system of claim 1, wherein the suspended runner system is configured to automatically lock the cage base and the cage top together when the cage top and cage base are inserted into the rack.

3. The monitoring system of claim 1, wherein a rear of the data collection rack includes a socket attachment for removably receiving a cable, the cable being coupled to a rear of the removable data collection platform.

4. The monitoring system of claim 1, wherein the at least one data collection processor is a portable collection processor.

5. The monitoring system of claim 1, wherein the at least one data collection processor is a mountable data collection processor, the mountable data collection processor being removably mounted to the data collection rack.

6. The monitoring system of claim 5, wherein the mountable data collection processor is removably mounted to a side of the data collection rack.

7. The monitoring system of claim 5, wherein the mountable data processor includes at least one hanger mounted on a rear surface of the mountable data processor, the at least one hanger can be removably attached to the data collection rack.

8. The monitoring system of claim 7, wherein the at least one hanger includes a flange.

9. The monitoring system of claim 8, including a pair of the at least one hanger.

10. The monitoring system of claim 8, further comprising a bottom mount attached to a rear of the mountable data processor, the bottom mount includes a bottom mount flange.

11. The monitoring system of claim 1, wherein the data is transmitted wirelessly from the data collection platform to the at least one data collection processor, the data includes data directed to a temperature of an animal or data directed to movement of an animal inhabiting the animal cage.

12. A method for automatically monitoring conditions of animals in an animal cage comprising:

providing a data collection rack supporting at least one animal cage, the at least one animal cage comprising a cage top, the cage top including one or more walls extending from a ceiling, the ceiling is substantially flat and a cage base, the cage base including one or more walls extending from a floor, the cage base includes a top edge which extends from the cage base, the data collection rack includes a suspended runner system and a removable data collection platform associated with the at least one animal cage, the removable data collection platform, the removable data collection platform includes a mount, the mount includes edge runners on either side of the mount, the removable data collection platform being independent from the at least one animal cage;

removably receiving the top edge of the at least one animal cage on a first pair of runners of the suspended runner system, a first runner of the first pair of runners positioned adjacent a first side of the at least one animal cage base and a second runner of the first pair of runners positioned adjacent a second side of the at least one animal cage;

removably receiving the edge runners on a second pair of runners of the suspended runner system, a first runner of the second pair of runners positioned adjacent a first side of the removable data collection platform and a second runner of the second pair of runners positioned adjacent a second side of the removable data platform to removably attach said data collection platform to said data collection rack, the cage base of the at least one animal cage being received on the mount of the data collection platform the removable data collection platform and the at least one animal cage being independently removable from the data collection rack;

transmitting data from the at least one animal cage;

receiving the data at said removable data collection platform, the data being associated with the at least one animal cage and/or the data being associated with an animal inhabiting the at least one animal cage; and forwarding the data to at least one data collection processor.

13. The method of claim 12, wherein the cage base and the cage top are snap fit together, the suspended runner system automatically locking the cage base and the cage top together when the cage top Ind the cage base are inserted into the rack.

14. The method of claim 12, wherein the at least one data collection processor is a mountable data collection processor, the mountable data collection processor being removably mounted to the data collection rack.

15. The method of claim 14, wherein the mountable data processor includes at least one hanger on a rear surface of the mountable data processor, the at least one hanger includes a flange.

16. The method of claim 15, wherein the mountable data processor includes a bottom mount, the bottom mount includes a bottom mount flange.

17. The monitoring system of claim 1, wherein the cage base of the at least one animal cage is received on the mount of the removable data collection platform.

18. The method of claim 12, wherein the cage base of the at least one animal cage is received on the mount of the removable data collection platform.

* * * * *